United States Patent
Nagarkar et al.

(10) Patent No.: US 8,195,612 B1
(45) Date of Patent: Jun. 5, 2012

(54) METHOD AND APPARATUS FOR PROVIDING A CATALOG TO OPTIMIZE STREAM-BASED DATA RESTORATION

(75) Inventors: Kuldeep Sureshrao Nagarkar, Pune (IN); Sinh Dang Nguyen, Eden Prairie, MN (US)

(73) Assignee: Symantec Corporation, Mountain View, CA (US)

( * ) Notice: Subject to any disclaimer, the term of this patent is extended or adjusted under 35 U.S.C. 154(b) by 370 days.

(21) Appl. No.: 12/241,387

(22) Filed: Sep. 30, 2008

(51) Int. Cl.
*G06F 7/00* (2006.01)
(52) U.S. Cl. .................................. 707/644; 707/650
(58) Field of Classification Search .............. 707/644, 707/645, 646, 741, 650, 653, 639, 346
See application file for complete search history.

(56) References Cited

U.S. PATENT DOCUMENTS

| | | | | |
|---|---|---|---|---|
| 5,901,331 | A * | 5/1999 | Schlegel | 710/22 |
| 7,266,655 | B1 * | 9/2007 | Escabi et al. | 711/162 |
| 2006/0179083 | A1 * | 8/2006 | Kulkarni et al. | 707/204 |
| 2007/0043705 | A1 * | 2/2007 | Kaushik et al. | 707/3 |

* cited by examiner

*Primary Examiner* — Tony Mahmoudi
*Assistant Examiner* — Fariborz Khoshnoodi
(74) *Attorney, Agent, or Firm* — Campbell Stephenson LLP

(57) ABSTRACT

A method and apparatus for providing a catalog to optimize stream-based restoration is described. In one embodiment, a method for providing a catalog to optimize stream-based restoration includes processing a catalog that indicates at least one location of at least one data block on backup media, wherein the at least one data block are associated with at least one backup for at least one object and accessing at least one data block using the catalog to create a data stream for restoring the at least one object.

17 Claims, 3 Drawing Sheets

METHOD AND APPARATUS FOR PROVIDING A CATALOG TO OPTIMIZE STREAM-BASED DATA RESTORATION

BACKGROUND OF THE INVENTION

1. Field of the Invention

Embodiments of the present invention generally relate to data protection and recovery systems and, more particularly, to a method and apparatus for providing a catalog to optimize stream-based data restoration from backup media (e.g., magnetic tape, disk and/or the like).

2. Description of the Related Art

In a typical computing environment, an organization may employ a number of technologies to process, store, recover, protect, produce and secure mission critical data. For example, the typical computing environment may include one or more database management systems for organizing and retrieving structured data records (e.g., tables) from one or more databases. As another example, the organization may employ one or more data protection and recovery systems to backup and restore the mission critical data after a disaster or data corruption. Furthermore, the typical computing environment may include one or more data storage systems for facilitating permanent storage, retrieval and transmission of the mission critical data throughout a computer network.

In addition, one or more components integrate various functionalities of disparate systems. For example, the database management system (e.g., ORACLE database) cooperates with the data protection and recovery system (e.g., SYMANTEC BackupExec) to backup a particular database to a storage device (e.g., magnetic tape) and restore data to the particular database at a later point in time (e.g., upon a failure). In such an example, a component of the database management system (e.g., ORACLE Recovery Manager (RMAN)) interacts with a corresponding component of the data protection and recovery system (e.g., ORACLE Agent for SYMANTEC NetBackup and/or BackupExec).

The recovery manager of the database management system performs various backup and restore commands for the data protection and recovery system. For example, the database management system creates one or more backup sets (e.g., a backup image stream) from the particular database and communicates the one or more backup sets to the data protection system for storage (e.g., on magnetic tape). As another example, the data protection system creates one or more raw data streams from the one or more backup sets, which are fed to the database management system. Subsequently, the database management system uses the one or more raw data streams to recover a storage state of the particular database.

Because the recovery manager resides on a production host (server) within the computing environment, the backup and restore commands affect performance of various computer resources associated with the production host (i.e., services, applications, storage and/or the like). For example, the recovery manager creates a raw data stream for each backup set. In other words, if one full backup and N incremental backups were completed for a database, then N+1 raw data streams are created during granular object (e.g., file) restoration or full database restore. Consequently, N+1 raw data streams require a significant amount of computer resources (e.g., memory and processor resources) in order to recover a storage state of the database.

Therefore, there is a need in the art for a method and apparatus for providing a catalog to optimize stream-based granular object restoration off of the production host.

SUMMARY OF THE INVENTION

Embodiments of the present invention comprise a method and apparatus for providing a catalog to optimize stream-based data restoration. In one embodiment, a method for providing a catalog to optimize stream-based restoration includes processing a catalog that indicates at least one location of at least one data block on backup media, wherein the at least one data block are associated with at least one backup for at least one object and accessing at least one data block using the catalog to create a data stream for restoring the at least one object.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
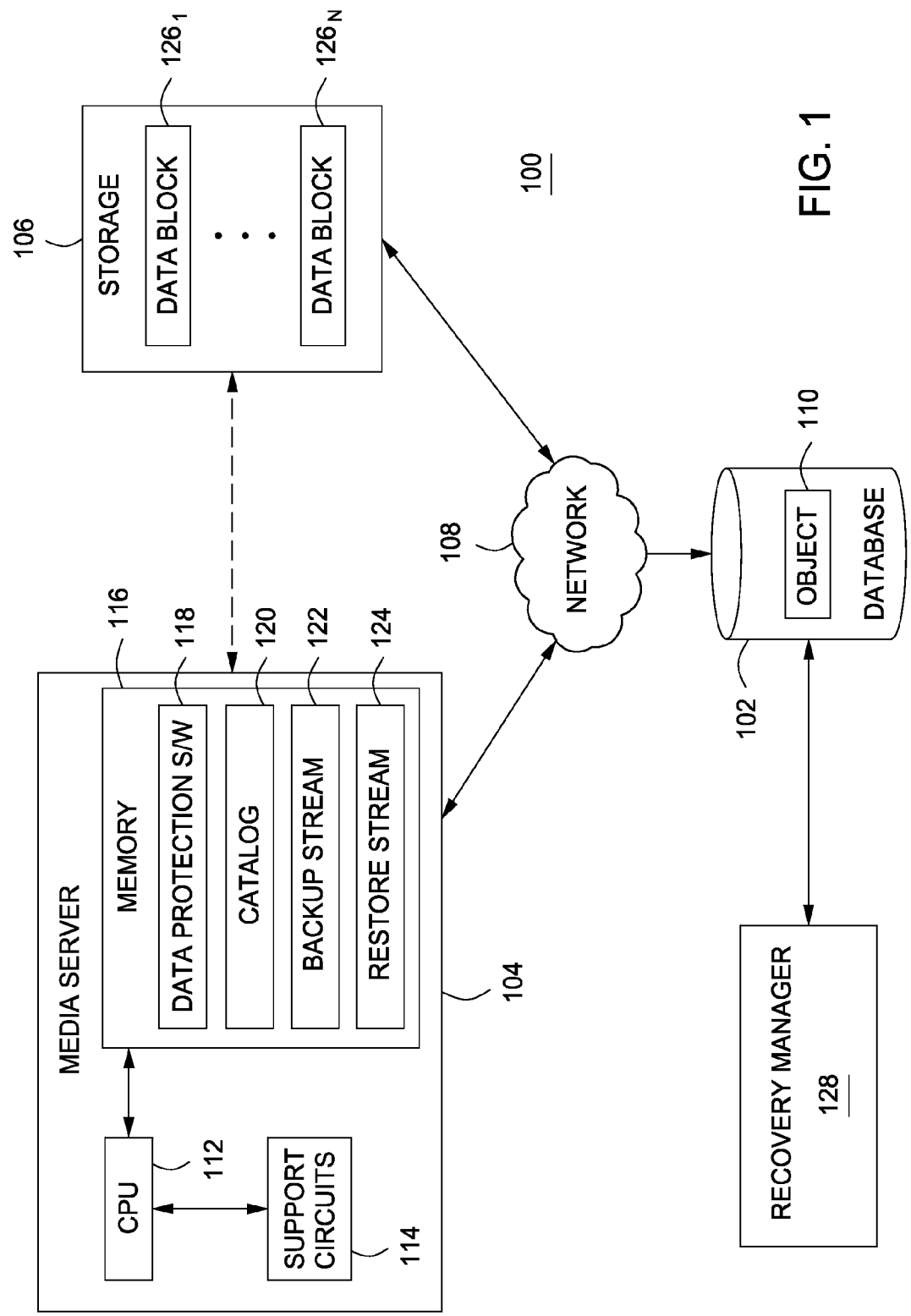
FIG. 1 is a block diagram of a system for providing a catalog to optimize stream-based data restoration according to one or more embodiments of the present invention.

FIG. 1 is a block diagram of a system 100 for providing a catalog to optimize stream-based data restoration according to one or more embodiments of the present invention. In one embodiment, the system 100 includes a database 102, a media server 104 and storage 106 where each is coupled to each other through a network 108.

The database 102 is an index of structured data records in accordance with a particular model (e.g., relational model, hierarchical model, network model and/or the like). For example, the database 102 may include a relational database management system that organizes and stores the structured data records, which may be retrieved through a query language (e.g., Structured Query Language (SQL)). Furthermore, the structured data records may be in the form of tables. The database 102 further includes objects 110 (e.g., one or more files organized in accordance with a file system). For example, the database 102 may be a MICROSOFT Exchange database (.edb) in which the objects 110 are emails, journal entries, schedules, contacts and/or the like. Furthermore, the database 102 is coupled to a recovery manager 128. Generally, the recovery manager 128 may include recovery management software (e.g., ORACLE Recovery Manager (RMAN)) for performing database operations related to various backup and restore commands as explained further below.

The media server 104 is a type of computing device (e.g., a laptop, a desktop, a Personal Desk Assistant (PDA), a tablet, a mobile phone and the like) that comprises a central processing unit (CPU) 112, various support circuits 114 and a memory 116. The CPU 112 may comprise one or more commercially available microprocessors or microcontrollers that facilitate data processing and storage. Various support circuits 114 facilitate operation of the CPU 112 and may include clock circuits, buses, power supplies, input/output circuits and/or the like. The memory 116 includes a read only memory, random access memory, disk drive storage, optical storage, removable storage, and the like. The memory 116 includes various software packages, such as data protection software 118. The memory 116 includes various data, such as a catalog 120. Furthermore, the memory 116 includes various data streams (e.g., raw data streams, backup image stream and/or the like), such as a backup stream 122 and a restore stream 124.

Generally, the media server 104 manages and performs various data protection and recovery activities, such as scheduling and tracking (database) backups to managing tape drives. In one embodiment, the media server 104 manages various backup, duplication and restore tasks for the database 102 (e.g., as well as one or more host computers, servers and remote clients) to directly attached or network-attached storage within the system 100, such as the storage 106 (e.g., backup media, such as magnetic tape, optical disk and the like). In one embodiment, the media server 104 enables Local Area Network (LAN)-free data protection for the database 102. In one embodiment, the media server 104 includes a VERITAS NetBackup ORACLE Agent that is integrated with the ORACLE Recovery Manager (RMAN) to backup and restore the database 102.

The storage 106 generally includes various components (i.e., hardware and software) that are configured to manage storage resources within a computing environment. The storage 106 includes backup media (e.g., magnetic tape) that facilitates permanent storage (i.e., backup) of critical computer data. Furthermore, the storage 106 includes one or more data storage devices (e.g., hard disk drives, optical drives, magnetic tape drives, a storage array (e.g., a RAID configuration) and/or the like), one or more controllers and software that provides an interface (e.g., Integrated Drive Electronics/AT Attachment (IDE/ATA), Small Computer Systems Interface (SCSI) and/or the like) to the one or more data storage devices for one or more computers (e.g., host servers, client computers and/or the like). In one embodiment, the storage 106 includes one or more data blocks, such as data blocks 126. Optionally, the storage 106 may form a relationship with the media server 104 as directly-attached or network-attached storage.

Generally, one or more backup image streams may be created for one or more backups (i.e., a full backup, an cumulative incremental backup, a differential incremental backup and/or the like) performed by enterprise backup software (e.g., SYMANTEC NetBackup products, SYMANTEC BackupExec products and/or the like) to protect a storage state of the database 102 according to one or more embodiments. In one embodiment, the backup stream 122 is a backup image stream that stores one or more objects (i.e., files) of various types (e.g., emails, word documents, aggregate data types, spreadsheets and/or the like). Furthermore, the backup image streams may be organized in a proprietary format within which the enterprise backup software identifies backups based on a type of the one or more objects, such as database-level backups, mailbox-level backups, file-level backups, volume-level backups and/or the like.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like. Furthermore, the network 108 may form a portion of a Storage Network Area (SAN) using various communications infrastructure such as Ethernet, Fibre Channel, InfiniBand, and the like.

The data protection software 118 includes software code that is configured to manage the performance of numerous data recovery tasks such backup, restore, replicate and/or the like. In one embodiment, the data protection software 118 initiates the creation of a data stream for storing and transmitting data (e.g., a backup image stream, a raw data stream and/or the like). For example, the data protections software 118 uses ORACLE Recovery Manager to create a data stream for backing up and/or restoring ORACLE databases.

In operation, the data protection software 118 processes the backup stream 122 from the database 102. In one embodiment, the backup stream 122 may include a header portion, one or more data blocks and a footer portion. Each data block of the one or more data blocks may be associated with a unique identifier (e.g., a block number). Then, the data protection software 118 stores the one or more data blocks in the storage 106 as the data blocks 126. For example, the data protection software 122 streams the data blocks 126 in block number order onto magnetic tape. In one embodiment, the data protection software 118 stores the block numbers and locations of the data blocks126 in the catalog 120.

In order to recover a granular object (e.g., a lost, deleted or corrupt file) or an entire database from the magnetic tape, the data protection software 118 utilizes the catalog 120 to create the restore stream 124 using the data blocks 126 according to one embodiment of the present invention. The data blocks 126 may be associated with one or more backup streams, such as the backup stream 122. In one embodiment, the data protection software 118 communicates the restore stream 124 to the recovery manager 128 to recover a storage state of the database 102. In one embodiment, the data protection software 118 establishes a recovery point for the object 110 and accesses the catalog 120 in order determine locations for one or more data blocks that form a portion of the object 110 to be recovered. Then, the data protection software 118 reads the one or more data blocks from the magnetic tape and creates the restore stream 124 for recovering the object 110. Accordingly, the restore stream 124 includes copies of the one or more data blocks. Subsequently, the one or more data blocks are written to the database 102 and the object 110 is restored. In another embodiment, the data protection software 118 creates the restore stream 124 with copies of one or more data blocks for recovering a storage state of the database 102 that is associated with the recovery point.

According to various embodiments of the present invention, the catalog 120 may be associated with one or more full backup streams and/or one or more incremental backup streams. In one embodiment, the catalog 120 is generated for one full backup stream and one or more incremental backup streams that are associated with a point in time after the full backup stream. For example, as data blocks for each backup stream is stored on magnetic tape, the data protection software 118 stores a block number and a location on the magnetic tape for each data block. Accordingly, the catalog 120 stores information regarding locations on the magnetic tape of each and every data block included within the full backup stream and the one or more incremental backup streams.

According to one or more embodiments, the backup stream 122 may be created for one or more full backups and/or one or more incremental backups of the database 102. For example, the backup stream 122 is created for a full backup and one or more incremental backups taken after the full backup. In one embodiment, the one or more incremental backups are cumulative (i.e., each incremental backup stream indicates modifications to a full backup streams). Hence, a particular cumulative incremental stream may include one or more data blocks, which replace or add to data blocks associated with the full backup. In another embodiment, the one or more incremental backups are differential (i.e., each incremental backup stream indicates modifications to a previous incremental stream). Therefore, a particular differential incremental backup stream may include one or more data blocks, which replace or add to data blocks associated with a previous differential incremental backup stream.

In one embodiment, the data protection software 118 synthesizes a data stream (i.e., the restore stream 124) for recovering a storage state of the database 102 at a point in time after a full backup and one or more incremental backups. According to one embodiment, the data protection software 118 processes the catalog 120 to determine locations for one or more data blocks on the magnetic tape. Subsequently, the data protection software 118 reads the one or more data blocks from the magnetic tape and synthesizes the restore stream 124.

In one embodiment, the data protection software 118 creates the restore stream 124 using various portions of the catalog 120 that are associated a full backup and one or more cumulative incremental backups. In operation, the data protection software 118 processes the catalog 120 to determine one or more locations of one or more data blocks associated with a latest cumulative incremental backup stream. The data protection software 118 reads the one or more data blocks from magnetic tape. Then, the data protection software 118 processes the catalog 120 to determine locations of one or more data blocks that are associated with a full backup stream and do not correspond with the one or more data blocks associated with the latest cumulative incremental backup stream.

For example, if the catalog 120 indicates a block number for a data block associated with the full backup stream that is equivalent to a block number for a data block associated with the latest cumulative incremental backup stream, the data protection software 118 does not read the data block associated with the full backup stream from the magnetic tape because the data block associated with the latest cumulative incremental backup stream includes one or more modifications subsequent to the full backup stream. As another example, if the catalog 120 indicates a block number for a data block associated with the full backup stream that is not found amongst one or more block numbers for the one or more data blocks associated with the latest cumulative incremental backup stream, then the data protection software 118 does read the data block associated with the full backup stream since the latest cumulative incremental backup stream does not include a data block that replaces or modifies such a data block.

In another embodiment, the data protection software 118 creates the restore stream 118 using various portions of the catalog 120 that are associated a full backup stream and one or more differential incremental backup streams. In operation, the data protection software 118 processes the catalog 120 to determine one or more locations of one or more data blocks associated with a latest differential incremental backup stream. The data protection software 118 reads the one or more data blocks from magnetic tape. Then, the data protection software 118 processes the catalog 120 to determine locations of one or more data blocks associated with each previous backup stream (e.g., a full backup stream as well as one or more previous differential incremental streams) except for one or more previously accessed data blocks associated with a differential incremental backup stream related to a subsequent point in time. For example, if the catalog 120 indicates a block number for a data block associated with a particular backup stream (e.g., a full backup stream or a differential backup stream) that is equivalent to a block number for a data block associated with a subsequent differential incremental backup stream, the data protection software 118 does not read the data block associated with the particular backup stream from the magnetic tape because the data block associated with the subsequent differential incremental backup stream includes one or more modifications subsequent to the particular backup stream.

In one embodiment, the data protection software 118 accesses (i.e., reads) one or more data blocks associated with one or more differential incremental backup streams and a full backup stream in reverse chronological order (e.g., from the magnetic tape) and exclusive of one or more previously accessed (i.e., previously read) data blocks in accordance with the catalog 120. In one embodiment, one or more identifiers (e.g., block numbers) of the one or more data blocks do not correspond with the one or more previously accessed data blocks. For each differential incremental backup stream, the data protection software 118 reads each data block unless an identifier for a particular data block corresponds with an identifier for a previously read data block (i.e., a more recent version of the particular data block was previously accessed to create the restore stream 124). For example, data blocks having block numbers associated with each previous differential incremental backup stream are used to create the restore stream 124 except for any data block having a block number associated with a differential incremental backup stream for a later point in time. Hence, after the data protection software 118 reads a particular data block having a block number, the data protection software 118 does not read another data block having the same block number.

In one embodiment, the database 102 includes a database management system for relational databases (e.g., ORACLE Database). As mentioned above, the recovery manager 128 may include recovery manager software (e.g., ORACLE Recovery Manager (RMAN)) for performing database operations related to various backup and restore commands. In one embodiment, the recovery manager 128 interprets backup and restore commands, directs server sessions to execute such commands and records data protection and recovery activity. In one embodiment, the database 102 cooperates with the media server 104 to perform backup and restore commands.

In one embodiment, the recovery manager 128 provides an interface for integrating with the data protection software 118 (e.g., SYMANTEC BackupExec). Through such an interface, the data protection software 118 instructs the recovery manager 128 to create one or more backup sets (e.g., backup image stream or copy of the data), such as the backup stream 122 according to one embodiment. In addition, the data protection software 118 communicates the restore stream 124 to the recovery manager 128 in order to enable stream-based data restoration. The recovery manager 128 is further designed to convert the restore stream 124 into a backup set (i.e., a backup image stream). In one embodiment, the recovery manager 128 removes one or more unused data blocks from the restore stream 124 to create the backup set.

In one embodiment, the data protection software 118 is designed to reduce redundant data and achieve deduplication. For example, the data protection software 118 may compute a fingerprint for each data block that is processed and streamed to magnetic tape. Generally, the fingerprint may be a unique pattern (e.g., a pattern of data, such as words) that identifies the data block. The fingerprints may be one or more scanned portions of the data block. In another embodiment, the fingerprint may be based on a natural language technique, such as n-grams. In yet another embodiment, the fingerprint may be checksum that is computed for the data block.

In one embodiment, the data protection software 118 compares a fingerprint of a data block with a fingerprint for another data block in order to identify a redundant data block. If the fingerprints match, then the data block and the another data block are copies of each other and redundant. Otherwise, the data block includes data that differs from the another data block. If both of the data blocks are redundant, then the data protection software 118 streams either the data block or the another data block to the magnetic tape. Accordingly, the data protection software 118 creates the restore stream 124 without include redundant data blocks.

Figure 2:
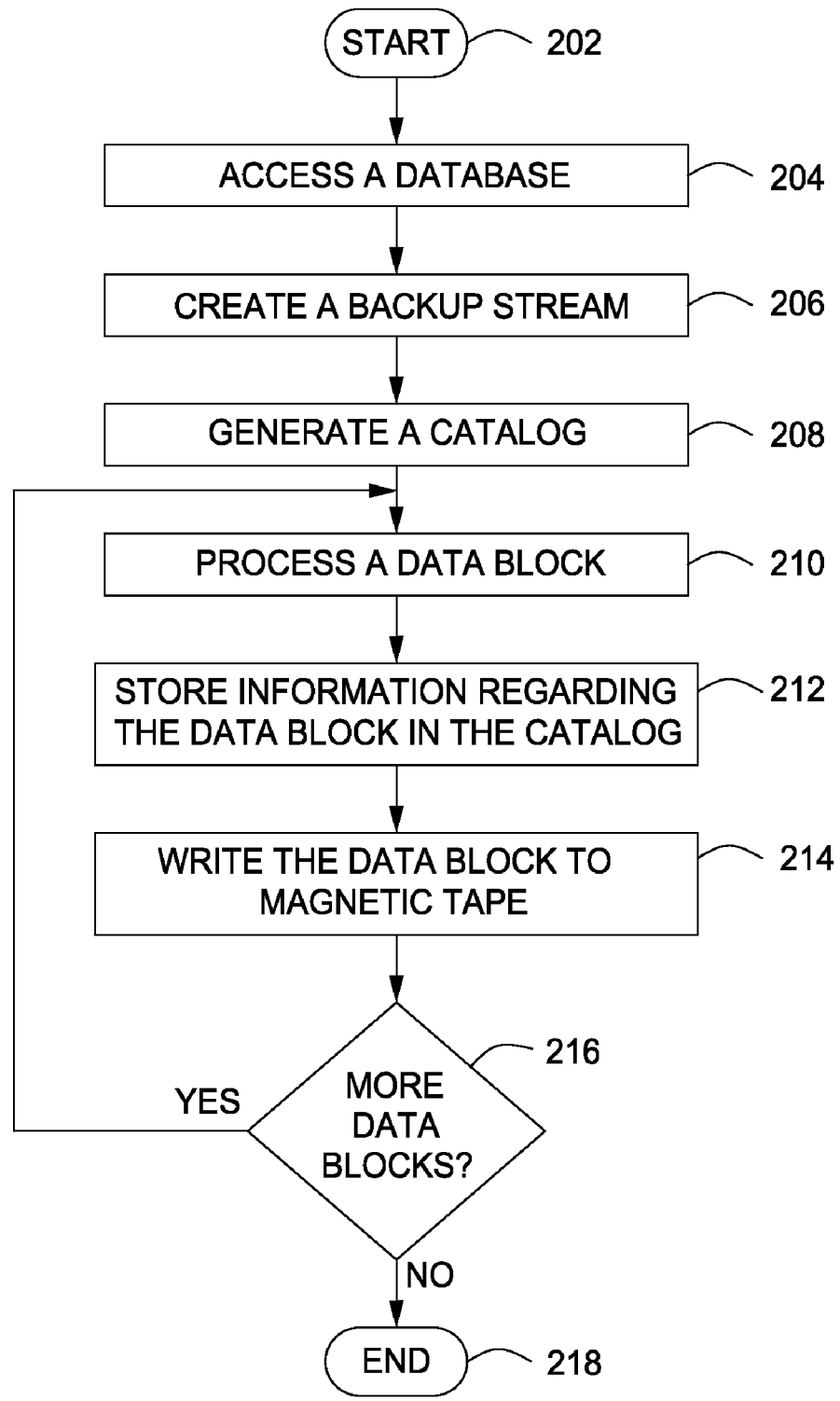
FIG. 2 is a flow diagram of a method for providing a catalog to optimize stream-based data restoration according to one or more embodiments of the present invention.

FIG. 2 is a flow diagram of a method 200 for providing a catalog to optimize stream-based data restoration according to one or more embodiments of the present invention. The method 200 starts at step 202 and proceeds to step 204 where a database (e.g., the database 102 of FIG. 1) is accessed.

At step 206, a backup stream (e.g., the backup stream 122 of FIG. 1) is created. At step 208, a catalog (e.g., the catalog 120 of FIG. 1) is generated. For example, the catalog maintains information regarding data blocks (e.g., the data blocks 126 of FIG. 1) of the backup stream (e.g., locations of the data blocks on magnetic tape). At step 210, a data block of the backup stream is processed. At step 212, the data block is written to tape. At step 214, information regarding the data block is stored in the catalog. For example, an identifier (e.g., a block number) and location information for the data block is stored in the catalog by data protection software (e.g., the data protection software 118 of FIG. 1). At step 216, a determination is made as to whether there are more data blocks to be processed. If there are more data blocks to be processed, the method 200 returns to step 210. If there are no more data blocks to be processed, the method 200 proceeds to step 218. At step 218, the method 200 ends.

Figure 3:
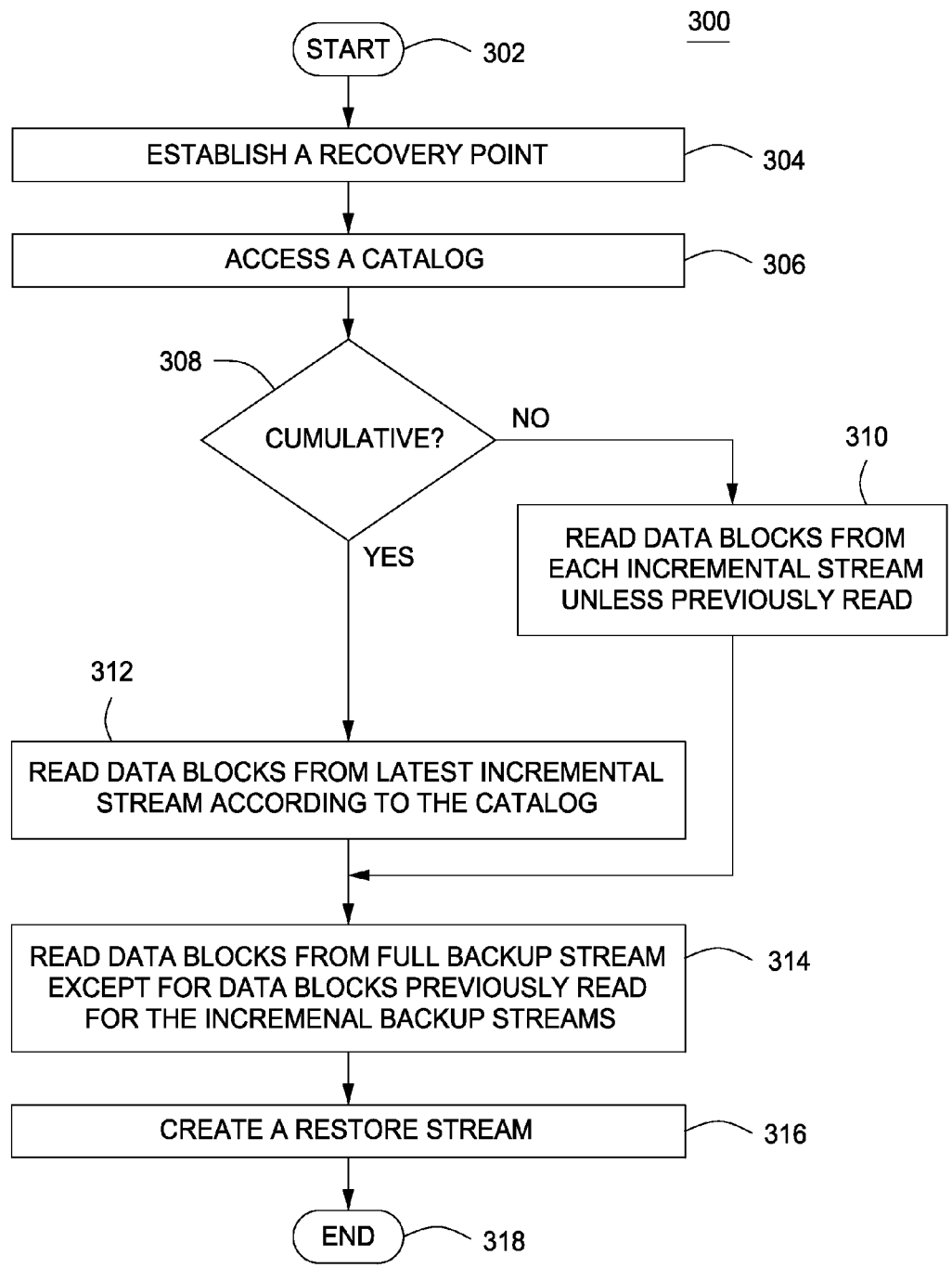
FIG. 3 is a flow diagram of a method for utilizing a catalog to synthesize a restore stream for restoring data from one or more backup streams according to one or more embodiments of the present invention.

FIG. 3 is a flow diagram of a method 300 for utilizing a catalog to synthesize a restore stream from one or more backup streams according to one or more embodiment of the present invention. In one embodiment, the method 300 begins after the method 200. The method 300 starts at step 302 and proceeds to step 304 where a recovery point is established. As mentioned above, a restore stream (e.g., the restore stream 124 of FIG. 1) is a synthesized data stream to restore a storage state of the database 102 at the recovery point.

At step 306, a catalog (e.g., the catalog 120 of FIG. 1) is accessed. In one embodiment, the catalog indicates a full backup stream and one or more incremental streams to be used for synthesizing the data stream. At step 308, a determination is made as to whether the one or more incremental streams are cumulative. If the one or more incremental streams are not cumulative (i.e., differential), the method 300 proceeds to step 310. At step 310, data blocks are read from each incremental stream of the one or more incremental streams unless previously read. If the one or more incremental streams are cumulative, the method 300 proceeds to step 312. At step 312, data blocks from a latest incremental stream are read according to the catalog. At step 314, data blocks from the full backup stream are read except for data blocks (i.e., block numbers) previously read for the incremental backup streams. At step 316, a restore stream is created. At step 318, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for improving a restoration, the method comprising:
   creating a catalog, wherein
      the catalog indicates at least one location of at least one data block stored on backup media, and
      the at least one data block is associated with a full backup stream and at least one differential incremental backup stream for at least one object;
   examining the catalog to identify at least one data block associated with a first differential incremental backup stream stored on the backup media;
   accessing the at least one data block associated with the first differential incremental backup stream from the backup media;
   examining the catalog to identify at least one data block associated with a second differential incremental backup stream stored on the backup media, wherein
      the second differential incremental backup stream is performed before the first differential incremental backup stream, and
      the at least one data block associated with the second differential incremental backup stream has at least one identifier that does not correspond with the at least one data block associated with the first differential incremental backup stream;
   accessing the at least one data block associated with the second differential incremental backup stream from the backup media;
   examining the catalog to identify at least one data block associated with the full backup stream stored on the backup media, wherein
      the at least one data block associated with the full backup stream has at least one identifier that does not correspond with the at least one data block associated with the first differential incremental backup stream and the at least one data block associated with the second differential incremental backup stream;
   accessing the at least one data block associated with the full backup stream from the backup media; and
   creating a data stream for restoring the at least one object, wherein
      the data stream is created using the at least one data block associated with the first differential incremental backup stream, the at least one data block associated with the second differential incremental backup stream, and the at least one data block associated with the full backup stream.

2. The method of claim 1, further comprising:
   establishing a recovery point for a database, wherein
      the database comprises the at least one object.

3. The method of claim 1, further comprising:
   establishing a recovery point for a database, wherein
      the database comprises the at least one object;
   examining the catalog to identify at least one data block associated with a third differential incremental backup stream and stored on the backup media, wherein
      the third differential incremental backup stream is performed before the second differential incremental backup stream;

accessing the at least one data block associated with the third differential incremental backup stream from the backup media; and creating the data stream for restoring the database using the at least one data block associated with the first differential incremental backup stream, the at least one data block associated with the second differential incremental backup stream, the at least one data block associated with the third differential incremental backup stream, and the at least one data block associated with the full backup stream.

4. The method of claim 1, further comprising:

examining the full backup stream, the first differential incremental backup stream, and the second differential incremental backup stream to create the catalog.

5. The method of claim 4, further comprising:

accessing a backup stream that comprises a plurality of data blocks;

streaming at least one data block of the plurality of data blocks onto magnetic tape;

storing information regarding the at least one data block of the plurality of data blocks in the catalog; and repeating the accessing and the storing for each backup stream of the full backup stream, the first differential incremental backup stream, and the second differential incremental backup stream.

6. The method of claim 5, wherein the storing the information regarding the at least one data block of the plurality of data blocks in the catalog further comprising:

updating the catalog with an identifier and a location on the magnetic tape of the at least one data block of the plurality of data blocks; and repeating the updating for each data block of the plurality of data blocks.

7. The method of claim 6, wherein the updating the catalog further comprises:

computing a fingerprint for the at least one data block of the plurality of data blocks.

8. The method of claim 7, wherein the updating the catalog further comprises:

updating the catalog with the fingerprint, the identifier, and the location on the magnetic tape of the at least one data block of the plurality of data blocks.

9. The method of claim 7, further comprising:

comparing the fingerprint for the at least one data block with the catalog to identify at least one redundant data block of the plurality of data blocks.

10. The method of claim 9, wherein the magnetic tape comprises a data block of the at least one redundant data block.

11. An apparatus for improving a restoration, comprising:

a processor;

a memory; and data protection software, using said processor, for:

creating a catalog, wherein the catalog indicates at least one location of at least one data block stored on backup media, and the at least one data block is associated with a full backup stream and at least one differential incremental backup stream for at least one object, examining the catalog to identify at least one data block associated with a first differential incremental backup stream stored on the backup media, accessing the at least one data block associated with the first differential incremental backup stream from the backup media, examining the catalog to identify at least one data block associated with a second differential incremental backup stream stored on the backup media, wherein the second differential incremental backup stream is performed before the first differential incremental backup stream, and the at least one data block associated with the second differential incremental backup stream has at least one identifier that does not correspond with the at least one data block associated with the first differential incremental backup stream, accessing the at least one data block associated with the second differential incremental backup stream from the backup media;

examining the catalog to identify at least one data block associated with the full backup stream stored on the backup media, wherein the at least one data block associated with the full backup stream has at least one identifier that does not correspond with the at least one data block associated with the first differential incremental backup stream and the at least one data block associated with the second differential incremental backup stream, accessing the at least one data block associated with the full backup stream from the backup media, and creating a data stream for restoring the at least one object, wherein the data stream is created using the at least one data block associated with the first differential incremental backup stream, the at least one data block associated with the second differential incremental backup stream, and the at least one data block associated with the full backup stream.

12. The apparatus of claim 11, wherein the data protection software is further for:

establishing a recovery point for a database, wherein the database comprises the at least one object, examining the catalog to identify at least one data block associated with a third differential incremental backup stream stored on the backup media, wherein the third differential incremental backup stream is performed before the second differential incremental backup stream, accessing the at least one data block associated with the third differential incremental backup stream, and creating the data stream for restoring the database using the at least one data block associated with the first differential incremental backup stream, the at least one data block associated with the second differential incremental backup stream, the at least one data block associated with the third differential incremental backup stream, and the at least one data block associated with the full backup stream.

13. The apparatus of claim 11, wherein the data protection software is further for:

examining the first differential incremental backup stream, the second differential incremental backup stream, and the full backup stream to create the catalog.

14. The apparatus of claim 11, wherein the data protection software is further for:

accessing a backup stream that comprises a plurality of data blocks, streaming at least one data block of the plurality of data blocks onto backup media, storing information regarding the at least one data block of the plurality of data blocks in the catalog, and repeating the accessing and the storing for each backup stream of the full backup stream, the first differential incremental backup stream, and the second differential incremental backup stream.

15. The apparatus of claim 14, wherein the data protection software is further for:
comparing a fingerprint for a data block of the at least one data block with the catalog to identify at least one redundant data block of the plurality of data blocks.

16. A system comprising:
a database, comprising at least one object;
storage, comprising backup media; and
a media server, comprising:
data protection software, wherein the data protection software is configured to
create a catalog, wherein
the catalog indicates at least one location of at least one data block stored on the backup media, and
the at least one data block is associated with a full backup stream and at least one differential incremental backup stream for the at least one object,
examine the catalog to identify at least one data block associated with a first differential incremental backup stream stored on the backup media,
access the at least one data block associated with the first differential incremental backup from the backup media,
examine the catalog to identify at least one data block associated with a second differential incremental backup stream stored on the backup media, wherein
the second differential incremental backup stream is performed before the first differential incremental backup stream, and
the at least one data block associated with the second differential incremental backup stream has at least one identifier that does not correspond with the at least one data block associated with the first differential incremental backup stream,
access the at least one data block associated with the second differential incremental backup stream from the backup media,
examine the catalog to identify at least one data block associated with the full backup stream stored on the backup media, wherein
the at least one data block associated with the full backup stream has at least one identifier that does not correspond with the at least one data block associated with the first differential incremental backup stream and the at least one data block associated with the second differential incremental backup stream,
accessing the at least one data block associated with the full backup stream from the backup media, and
create a data stream for restoring the at least one object, wherein
the data stream is created using the at least one data block associated with the first differential incremental backup stream, the at least one data block associated with the second differential incremental backup stream, and the at least one data block associate with the full backup stream.

17. The system of claim 16, further comprising:
a recovery manager coupled to the database for processing the data stream to recover a storage state of the at least one object.

* * * * *